United States Patent [19]

Milligan et al.

[11] Patent Number: 4,602,262

[45] Date of Patent: Jul. 22, 1986

[54] PRINTING APPARATUS WITH SHIFTING OF HEAD OR DRUM TO IMPROVE RESOLUTION

[75] Inventors: Ray K. Milligan, Indiatlantic, Fla.; Sean H. Milligan, Raleigh, N.C.

[73] Assignee: Helene Holding Company, Melbourne, Fla.

[21] Appl. No.: 541,680

[22] Filed: Oct. 13, 1983

[51] Int. Cl.⁴ .............................................. G01D 15/14
[52] U.S. Cl. .................................. 346/160; 346/153.1; 358/302; 355/3 R
[58] Field of Search ................. 346/153.1, 155, 160, 346/74.2, 74.5, 107 R, 139 B, 139 C, 139 D; 358/300-302; 400/119; 355/3 R

[56] References Cited

U.S. PATENT DOCUMENTS

| | | | |
|---|---|---|---|
| 3,921,181 | 11/1975 | Hauser | 346/139 C X |
| 4,090,206 | 5/1978 | Pfeifer et al. | 346/107 R |
| 4,366,488 | 12/1982 | Westwood et al. | 346/74.2 X |
| 4,424,524 | 1/1984 | Daniele | 346/160 |
| 4,477,175 | 10/1984 | Snelling | 358/300 X |

FOREIGN PATENT DOCUMENTS

| | | | |
|---|---|---|---|
| 55-97959 | 7/1980 | Japan | 400/119 |
| 58-99066 | 6/1983 | Japan | 358/296 |

OTHER PUBLICATIONS

"Dual Resolution Ink Jet Drum Printer", Althauser et al., IBM Tech Disclosure, vol. 23, No. 7A, Dec. 1980, pp. 2700-2702.

Primary Examiner—A. Evans
Attorney, Agent, or Firm—William M. Hobby, III

[57] ABSTRACT

This invention relates to a non-impact printer apparatus such as a xerographic, magnetic, or ion deposition type printer in which the image is produced with a plurality of dots, which collectively combine to form the characters of a printed text or plot. The printer includes a dot forming array for selectively generating dots to form a pattern on a rotating transfer drum or belt. The drum having an image on the surface thereof, is adapted to transfer the image onto sheet material. The drum rotates through a plurality of rotations while an image is being formed thereon prior to transferring that image to a sheet. This is accomplished by selectively activating the drum charging mechanism, as well as the drum cleaning and toning mechanisms. The dot forming array may be an array of light emitting diodes and either the array or the drum are shifted between rotations to allow the same dot forming array to transfer dots to a different position during each rotation of the drum.

21 Claims, 9 Drawing Figures

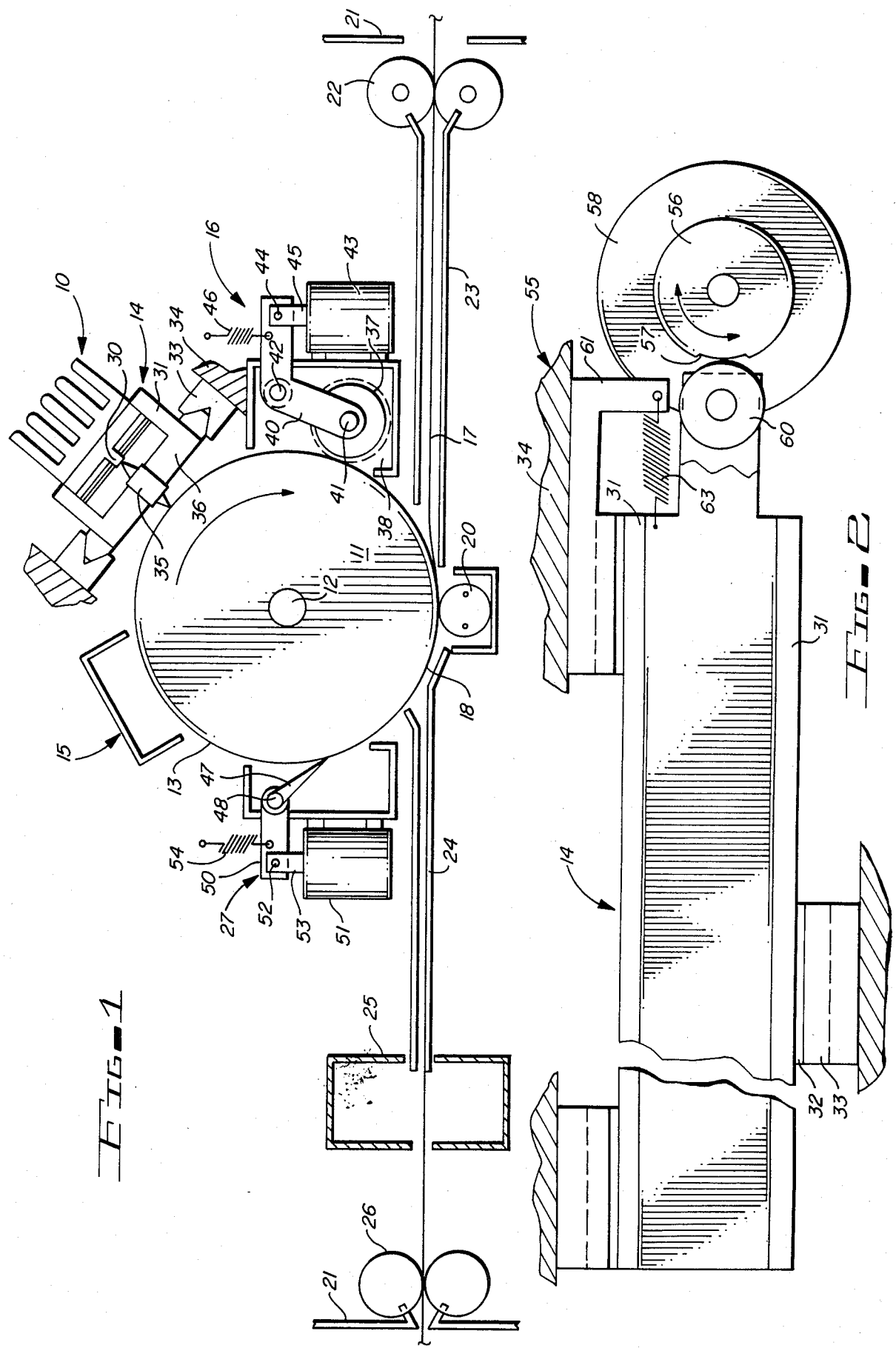

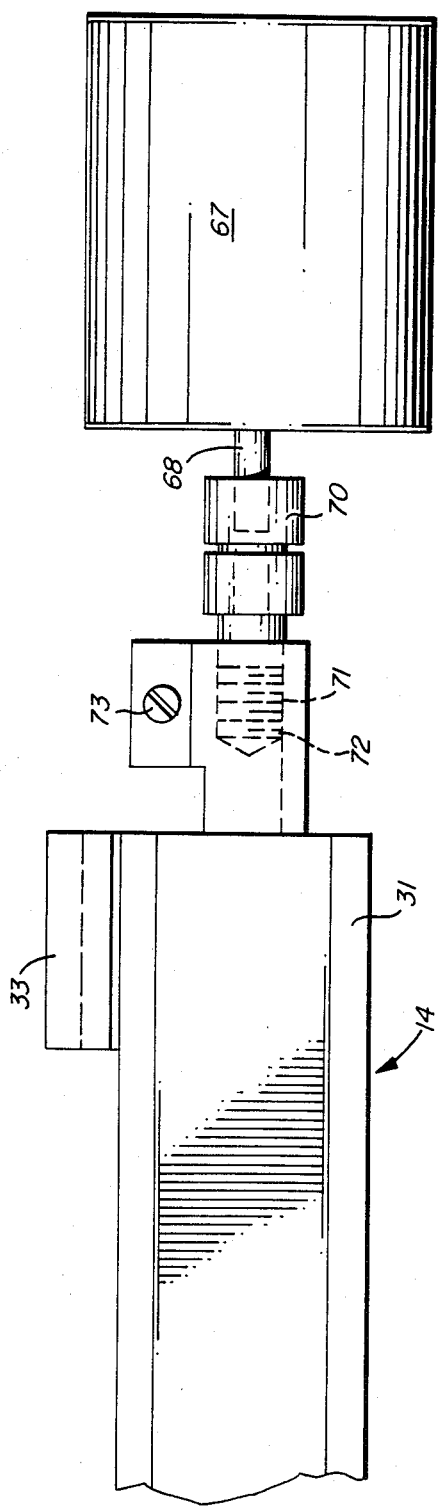
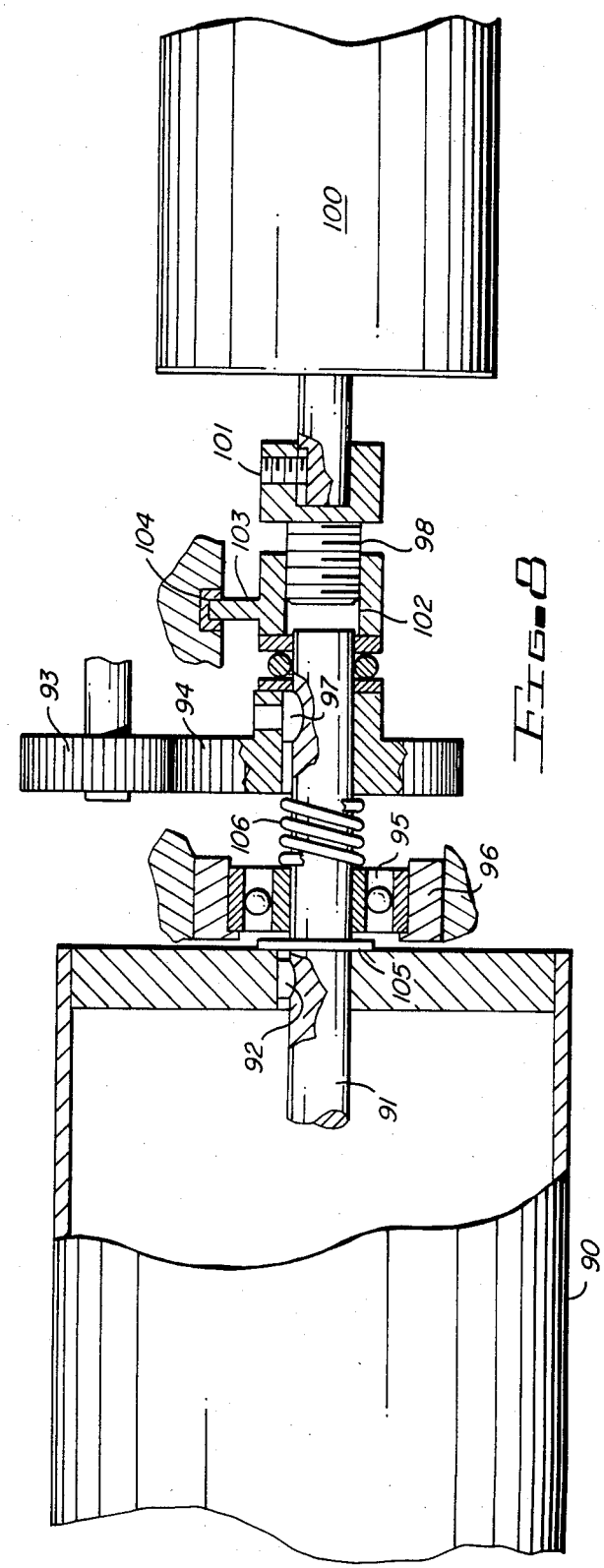

PRINTING APPARATUS WITH SHIFTING OF HEAD OR DRUM TO IMPROVE RESOLUTION

BACKGROUND OF THE INVENTION

Non-impact printers such as xerographic printers are coming into more frequent use as a result of the advances in technology relative to printers. One such type of printer is a xerographic printer in which light emitting diodes (LEDs) are enabled in a selected manner to create an image on a photo conductive surface on a rotating drum or belt to produce a plurality of dots thereon which collectively combine to form the characters of a printed text or other graphic representations. In such a device, an input is supplied to the electronics of the print head which controls the enabling of the LED's, or the like, so that the text being inputted will be reproduced in a charged xerographic surface in the form of the image. This image may then be developed and transferred onto paper, or the like, as is well known in the art.

One of the problems with prior LED or other dot matrix type of non-impact printers is that a large array of LED's or elements must be positioned in a line across the surface of a rotating drum or a moving belt in order to place an appropriate number of dots to form letter images having high resolution. It would, for instance, be desirable to have letters which approach preformed impact letters such as found in many printers and typewriters, so as to avoid being readily identifiable dot matrix type printing. To improve the resolution requires that a larger number of LED's be accurately positioned adjacent each other in a small space. Physical limitations in current technology limit the number of LED's that can economically be placed in a small space and this will not reproduce an image of the high quality desired. In addition, if one or more LED's becomes disabled, the image is degraded and generally the whole LED array must be replaced. To overcome the limitations on space in setting forth an array of LED's it has been suggested to align the LED's in a plurality of rows, each row having the LED's offset from the previous LED's. It has also been suggested in the past to use various types of polymer lens for forming the focal points and otherwise improve the characters being reproduced by the printer.

In xerographic type printers, a photo receptor drum or belt has a photo receptor coating on its surface, which can be charged. The charged surface then has dots or other images placed on the surface by discharging the image area by an array of LED's or a rotating laser or other device. The image placed on the drum or belt is then developed with a toner, such as a powdered graphite toner, which is then applied to paper having moving contact with the rotating drum or belt. The image is then transferred to the paper using a transfer corona, or the like, and the image on the paper is fused thereto. The drum or belt has its photo receptor coatings cleaned to remove the image and charge from the surface thereof prior to it being recharged. This type of image transfer is commonly used in xerographic copy machines, except that rather than having a rotating laser or an LED array, the copying machine includes a direct transfer of an image through a lens onto the photo receptor surface. There are, of course, other well known means for electrically or magnetically transferring images to a drum or belt for transfer to a sheet of paper.

The present invention is aimed at a non-impact dot matrix type printer with an improved image for the number of dot producing elements being utilized by having an array of dot producing images shifted or a rotating drum shifted during successive rotations to utilize the same dot producing array in a different position to continue placing the image on the drum or on a moving belt. This inherently slows the speed of the printing but allows an improvement in the printed image and the production of high quality non-impact printer with high reliability and fewer components.

SUMMARY OF THE INVENTION

The present invention relates to non-impact dot matrix type printers which include a dot forming array for selectively generating dots to form a pattern onto a transfer surface such as a drum or moving belt having a receptor surface thereon. The drum or belt are rotatably mounted to receive the dot images on the surface thereof from the dot forming array and for placing the dot images formed thereon onto another surface positioned in accordance with the dot images thereon. Means are provided for charging the transfer surface on a drum or moving belt during at least one rotation of the transfer surface during a plurality of imaging rotations and for disabling the charging means during at least one rotation of the drum or belt. Means are also provided to shift the relative position of the dot forming array relative to the transfer surface of the drum or belt during successive rotations of the drum or belt, so that the drum may have dot images placed thereon during a plurality of rotations thereof. In addition to shifting the dot forming array, the photo receptor drum charging corona is selectively activated and deactivated during the rotation of a drum and the developing unit for developing the image on the drum is selectively activated and deactivated, as is the means for cleaning the surface of the drum. An array of dot forming LED's can be shifted by means of a stepping motor driving a cam, a screw coupling, or the like, for shifting the array of each successive rotation of the drum to position the array of LED's in successively different positions for each rotation. Alternatively, the drum may be shifted relative to a fixed array of LED's.

BRIEF DESCRIPTION OF THE DRAWINGS

Other objects, features and advantages of the present invention will be apparent from the written description and the drawings, in which:

FIG. 1 is a sectional view of a non-impact printer in accordance with the present invention;

FIG. 2 is a side sectional view of a cam shiftable imaging array in accordance with FIG. 1;

FIG. 5 is a top elevation of an alternate embodiment of a shifting imaging array;

FIG. 8 is a sectional view of a photo receptor drum shifting mechanism.

DESCRIPTION OF THE PREFERRED EMBODIMENTS

Figure 3:
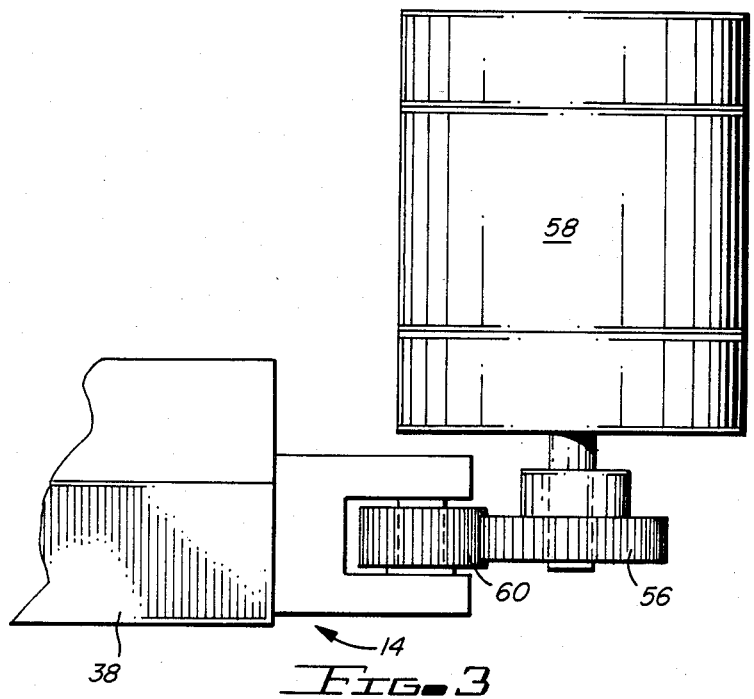
FIG. 3 is a top plan view of a shifting imaging surface in accordance with FIG. 2.

Referring to FIG. 1 of the drawings, a non-impact xerographic type printer 10 is illustrated having a photo receptor drum 11 rotating on a shaft 12 and having a photo receptor surface 13 on the surface thereof. The rotating drum is, of course, mounted to a frame by the shaft 12. An LED imaging array 14 is mounted for directing a dot matrix image onto the photo receptor drum 11 as the drum rotates, as illustrated by the arrow placed on the drum in the drawing. The surface of the drum 11 is first charged by the charging corona 15 and the image is placed thereon by the imaging array 14. The image is developed with a magnetic developer roll 16 and is then transferred to paper 17, passing along the bottom surface of the drum 18 adjacent a transfer corona 20. The paper 17 is fed into the housing 21 by a set of pinch rollers 22 through a paper feed track 23 adjacent the surface of a drum 11 into a paper guiding track 24 through a fusing station 25, which may include pressure fusing rollers, or alternatively, electric heating elements for fusing the toner onto the paper 17. The paper is then fed through a pair of feed rollers 26 and out the other end of the housing 21. After the graphite toner forms the image on the photo receptor drum 11 and is transferred to the paper 17, the surface of the drum 11 is cleaned and discharged by the drum cleaner 27 prior to being charged by the corona 15.

What has been generally described at this point is the conventional operation of a xerographic printer. The present invention, however, differs in that the imaging array 14 has an array of LED's having LED chips 30 therein mounted to a supporting frame 31 which has guide surfaces 32 riding in a track 33 mounted to the frame 34 on either side thereof. Thus the guides 32 and the tracks 33 provide a pair of linear bearings for the array 14 to move back and forth. In the embodiment illustrated, the LED array is mounted over a polymer fiber optic lens or plurality of lens 35 mounted to a bottom frame portion 36. A SELFOC array 35 focuses the LED beam onto the surface of the photo drum receptor 11, as will be described in FIGS. 2 through 7. The LED array 14 is shifted a portion of the LED spacing distance on the bearings 32 and 33 in an oscillating motion to position an array of LED's in a different position for each successive rotation of the drum 11. The drum 11 has a conventional photo receptor surface thereon.

In the present invention, the drum 11 is rotated more than once prior to transferring the image from the drum onto the paper 17. This allows the LED array to continue to place imaging dots on the drum 11 surface during two or more successive rotations of the drum and to shift the array or to alternatively shift the drum 11 between each rotation, so that the LED's imaging dots are in different positions during successive rotations. This allows the use of fewer LED's or other dot forming means to place the images onto the surface of a drum prior to applying the toner and transferring the image to the paper 17. The charge corona 15 may be turned on and off responsive to shifts in the image forming array 14. The magnetic developer roll 37 applies the toner heel in the toner container 38 to the surface of the drum 11, which is mounted to a linkage 40 and rides on a shaft 41. The linkage 40 is held by a shaft 42 and may be actuated to an enabling or disabling position by the solenoid 43, which is connected by a pin 44 to the solenoid arm 45. The solenoid 43 may work in connection with a spring return 46, which in the present embodiment maintains the rolls 37 in a disabled position until the solenoid is actuated.

The transfer corona or roller 20 would not have a toned image to transfer during rotations of the drum 11 while the image is being placed thereon. The drum cleaner 27 includes a wiper blade or brush 47 for cleaning the surface of the drum 11. The wiper 47 is mounted with a shaft 48 to a link member 50, which in turn is attached to a solenoid 51 connected by pin 52 through a solenoid arm 53 to actuate the linkage 50 to actuate the wiper blades 47 into and out of contact with the surface of the drum 11. The linkage 50 has a return spring 54 which normally holds the wiper arm 47 out of contact with the surface of the drum 11 until the solenoid 51 is actuated. Thus, in operation the imaging array 14 begins applying an image responsive to a computer forming a dot matrix pattern onto the photo receptor surface of the drum 11 while the drum rotates through one rotation. The imaging array 14 may then shifted and continue to place the image for the second rotation with the dots being formed on the surface in an adjacent position than from the prior rotation. The image can be formed during two, three, or four rotations, or as many rotations as desired without departing from the spirit and scope of the invention.

While the image is being placed on the photo receptor drum 11, the magnetic developer roller 47 is disabled as is the drum cleaner 27, the charge corona 15 and the transfer corona. The charge corona 15 has already placed a charge on the surface of the drum 11 during the first rotation but is disabled for the second and successive rotations during the imaging of the surface of the drum 11. Once the imaging is completely placed on the surface of the drum 11, the solenoid 43 is actuated to place the toner roller 37 against the drum surface to apply a toner, such as a powdered graphite toner to the charged surface of the drum. This image typically forms a plurality of dots which collectively combine to form the characters of a printed text which is then transferred at the transfer corona 20 to the paper 17 as the paper passes through. The paper passes on through the fuser station 25 where the toner is fused thereto prior to the feed rollers 26 feeding the paper out of the printer. After the image transfers from the drum 11 to the paper 17, the wiper solenoid 51 is actuated to position the wiper blade 47 against the drum surface to clean the drum surface and then the charge corona 15 is actuated to recharge the surface of the drum 11 for the next image to be formed thereon by the LED array 14. It will, of course, be clear that while the present invention is illustrated in connection with an LED array and a rotating drum, that other image forming arrays and a rotating belt can be utilized without departing from the spirit and scope of the invention.

Figure 4:
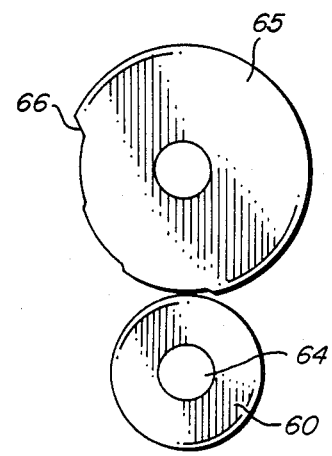
FIG. 4 is a sectional view of a camming surface having a four step cam for use in connection with FIGS. 2 and 3.

Turning to FIGS. 2 through 4, a mechanism 55 for shifting the image forming array 14 is illustrated having a rotating cam 56 having a pair of stepped surfaces 57 driven by rotating motor 58. The rotating motor 58 drives the cam 56 against a cam follower 60 attached to one end of the frame 31 having the linear bearing surfaces 32 riding in the bearing tracks 33 on either side thereof. The frame 31 of the printer 34 has an arm 61 supporting one end of a spring 62. The spring 62 is connected to the frame 31 for returning the image forming array 14 and maintaining the cam follower 60 against the camming surface of the cam 56. A stepping motor is utilized and can step the rotation of the cam as desired.

FIG. 4 shows the cam follower 60 riding on a shaft 64 with a different cam 65 having four steps 66 for shifting the dot matrix image forming array 14 to four different positions during four rotations of the drum 11 of FIG. 1. FIG. 5 shows an alternate embodiment for shifting the LED array 14 having the frame portion 31 riding in the bearing portion 33 and driven by a stepping or servo motor 67 having a rotating motor shaft 68 mounted through a coupling 70 to a lead screw 71, threaded in a threaded nut 72 with a back lash adjustment screw 73. The rotation of the stepping motor rotates the lead screw to move the array 14 back and forth as desired.

Figure 6:
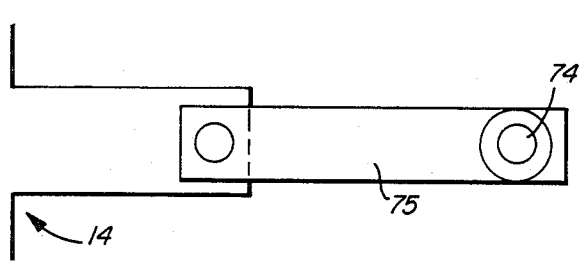
FIG. 6 is a sectional view of yet another imaging array shifting mechanism.
Figure 6A:
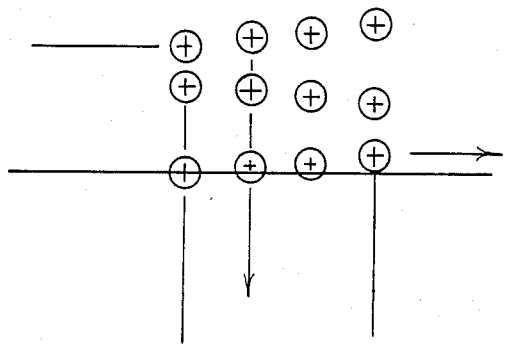
FIG. 6A is a shifting pattern of an LED array.

FIG. 6 shows another embodiment in which the LED array 14 is shifted with an eccentric 74 or shaft having its axis of revolution displaced from its center and attached to a motor and held by a strap 75 to the array 14. FIG. 6A illustrates the shifting array pattern and the space between dots during drum rotation, while the LED array shifts to the right and the drum rotation downward.

Figure 7:
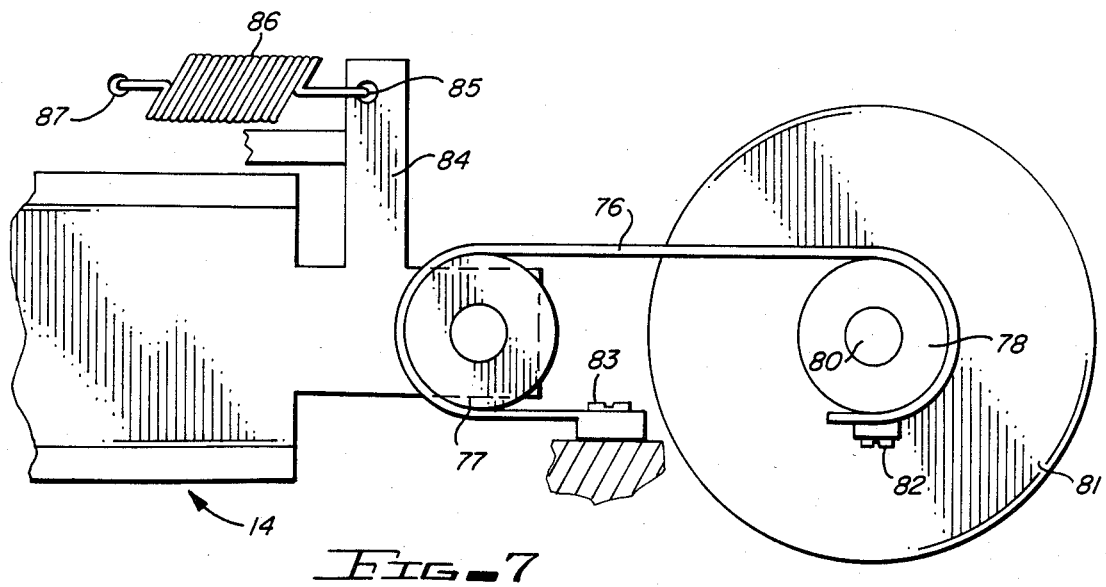
FIG. 7 is a sectional view of yet another shifting array mechanism.

FIG. 7 shows another embodiment of the shifting of the LED array 14 with a steel band 76 wrapped around a pulley 77. A pulley 78 is attached to the shaft 80 of a stepping or servo motor 81. The steel band 76 is attached with a screw 82 to the pulley member 78 and to the frame with a screw 83, while an arm 84 has an aperture 85 therein and a spring 86 connected to the frame 87 so that rotation of the motor 81 back and forth through steps will shift the LED array in any number of steps desired.

In FIG. 8, the non-impact printer of FIG. 1 is operated by shifting the drum 11 rather than by shifting the image forming array 14. A shifting drum 90 mounted to a drum shaft 91 has a key 92 therein. A shaft 91 is connected to drive gears 93 and 94 and is mounted in a bearing mount 95 to the frame 96. The shaft 92 is supported to the gear 94 through a key 97 and is attached to a lead screw 98 which in turn is attached to a stepping motor 100. Stepping motor 100 is attached with a coupling 101 to the lead screw 98 connected in a threaded aperture 102 and guided with a guide 103 riding in a track 104 in the frame. Rotation of the stepping motor 100 allows a lead screw 98 to move the shaft 91 having the flange 105 and key 92 supporting the drum 90 in and out on the bearing 95. The bearing 95 has a compression spring 106 between the bearing and the gear 94. The gears 93 and 94 can have a slight slippage between the teeth thereof. Thus, the drive gears 93 and 94 drive the rotation of the drum 90 while the stepping motor 100 moves the lead screw 98 to shift the drum to different positions for different rotations while the guide 103 prevents the rotation of the threaded aperture on the lead screw 98 and a slight slippage between the teeth of the drive gears 93 and 94 allow the movement of the shaft 91 of the drum 90.

It should be clear at this point, that a non-impact xerographic type printer using a light emitting diode array, or magnetic, or ion deposition has been illustrated which can reduce the number of LED's, or the like, in the array, or alternatively, can increase the resolution of the image applied by an array. Timing of the shifting array is accomplished by any of several well known timing techniques, such as a timing disk placed on the drum shaft and having an optical sensor on one side and an LED on the other to sense the position of markings on the disk. It should also be clear that other advantages such as an overlap of the shifting LED's will allow LED's which are broken or disabled not to affect the entire image or require the replacement of the entire LED array. It should also be clear that other dot matrix image forming arrays are contemplated as being within the scope of the invention, such as magnetic, or ion deposition as is the use of a coated surface on a rotating belt which rotates much like the drum except around idlers and drive rollers rather than around a central shaft.

Accordingly, the present invention is not to be construed as limited to the forms shown, which are to be considered illustrative rather than restrictive.

We claim:

1. An apparatus for producing dots which forms images on a surface comprising in combination:
   a dot forming array for selectively generating a plurality of groups of said dots to form each image;
   a transfer drum rotatably mounted to receive said dots on the surface thereof from said dot forming array, said transfer drum being adapted to place said dots onto another surface;
   charging means for charging said drum during at least one rotation of said drum of a plurality of rotations of said drum and to be disabled during at least one of said plurality of rotation of said drum;
   means to shift the relative position of said dot forming array relative to said transfer drum to permit one group of said groups of dots to be generated during one of said rotations and a difference groups of said groups of dots to be generated during a different rotation of said plurality of rotations of said drum; and
   developer means shiftably mounted for developing an image on said transfer drum in one position and having a second position disabling said developer means from developing the image on said transfer drum; and
   means to shift said developer means between said one position and said second position during selected of said rotations of said drum, whereby said drum may have said dots placed thereon during said plurality of rotations of the drum.

2. An apparatus in accordance with claim 1, in which said dot forming array is slidably mounted adjacent said transfer drum for shifting said dot forming array relative to said transfer drum with said means to shift the relative position of said dot forming array.

3. An apparatus in accordance with claim 2, in which said dot forming array is an array of light emitting diodes positioned adjacent to and directed towards said transfer drum.

4. An apparatus in accordance with claim 3, in which said dot forming array has a plurality of lenses positioned between said LED's and said transfer drum.

5. An apparatus in accordance with claim 4, including a drum cleaning means having a drum cleaning portion adapted to be shifted adjacent said drum for removing the charge from said drum in one position and movable to a second disabling position in which the charge on a transfer drum surface remains thereon during rotation thereby.

6. An apparatus in accordance with claim 5, in which said drum cleaning means includes a solenoid for shifting said drum cleaning portion from a first to a second position.

7. An apparatus in accordance with claim 6, in which said developing unit includes a solenoid for shifting a portion of said developing unit from a first to a second position.

8. An apparatus in accordance with claim 7, in which said dot forming array is mounted in a linear bearing and is cam actuated for shifting said dot forming array between a plurality of positions.

9. An apparatus in accordance with claim 7, in which said dot forming array rides on linear bearings and is actuated by a lead screw between a plurality of positions.

10. An apparatus in accordance with claim 1, in which said charging means is enabled every second rotation of said drum.

11. An apparatus in accordance with claim 1, in which said charging means is enabled every third rotation.

12. An apparatus in accordance with claim 5, in which said drum cleaning means shifts to clean said drum during every second rotation.

13. An apparatus in accordance with claim 5, in which said charging means turns on and said drum cleaning means is enabled and said developing means are each enabled during every second rotation of said drum.

14. An apparatus in accordance with claim 1, in which said transfer drum is slidably mounted adjacent said dot forming array and said transfer drum shifts positions with every rotation of said transfer drum.

15. An apparatus in accordance with claim 11, in which said transfer drum is shifted responsive to actuation of a stepping motor.

16. An apparatus in accordance with claim 2, in which said dot forming array is shifted responsive to the stepping of a stepping motor driving a shifting means between a plurality of positions responsive to the actuation of the stepping motor.

17. An apparatus for forming dots which forms images on a surface, comprising in combination:
   a transfer dot receiving surface movably mounted for having a plurality of groups of said dots placed thereon to form each image;
   imaging means for selectively transferring images to said transfer dot receiving surface such that a first group of said groups of dots is transferred during a first of a plurality of passes of said transfer dot receiving surface passed said image means and a second group of said groups of dots is transferred during a second of said plurality of passes;
   sheet feed means for feeding sheet material for transferring an image from said transfer dot receiving surface thereonto;
   means for selectively charging said transfer dot receiving surface during sequential of said passes of said transfer dot receiving surface;
   means for transferring said images from said transfer dot receiving surface onto sheet material after said plurality of passes of said transfer dot receiving surface past said imaging means, whereby an image may be transferred from said transfer dot receiving surface onto sheet material after a plurality of passes for forming the images;
   cleaning means for cleaning said transfer dot receiving surface in one cleaning means position and having a second cleaning means position disabling said cleaning means whereby said cleaning means cleans said transfer dot receiving surface; and
   means to shift said cleaning means to said disabling position during at least one of said first and second passes.

18. An apparatus in accordance with claim 17, in which said means for transferring said images to said transfer dot receiving surface includes a plurality of LED's slidably mounted adjacent said transfer dot receiving surface and selectively actuated to place an image on the surface of said transfer dot receiving surface.

19. An apparatus in accordance with claim 17, including a developer unit having a portion thereof adjacent said transfer dot receiving surface in one position and being moved away from said transfer dot receiving surface in a second position and having means for actuating said developer means during sequential said passes of said transfer dot receiving surface.

20. An apparatus in accordance with claim 17, in which said imaging means is slidably mounted adjacent said transfer dot receiving surface and includes a plurality of LED's having a plurality of positions for directing an image onto said transfer dot receiving surface in different positions during successive said passes of said transfer dot receiving surface.

21. An apparatus in accordance with claim 20, in which said imaging means includes means for shifting said imaging means between a plurality of positions including said stepping motor for driving said means for shifting said imaging means between said positions.

* * * * *